(12) United States Patent
Luo et al.

(10) Patent No.: US 8,325,090 B2
(45) Date of Patent: Dec. 4, 2012

(54) COMPUTER-IMPLEMENTED METHOD AND SYSTEM FOR LOCATING AN INDOOR OBJECT

(75) Inventors: Ren-Chyuan Luo, Taipei (TW); Chien-Chung Chen, Taichung (TW)

(73) Assignee: National Taiwan University, Taipei (TW)

(*) Notice: Subject to any disclaimer, the term of this patent is extended or adjusted under 35 U.S.C. 154(b) by 347 days.

(21) Appl. No.: 12/508,040

(22) Filed: Jul. 23, 2009

(65) Prior Publication Data

US 2010/0295733 A1 Nov. 25, 2010

(30) Foreign Application Priority Data

May 19, 2009 (TW) ................................ 98116540 A

(51) Int. Cl.
*G01S 5/14* (2006.01)
(52) U.S. Cl. ........................................................ 342/451
(58) Field of Classification Search .................. 342/450, 342/451
See application file for complete search history.

(56) References Cited

U.S. PATENT DOCUMENTS

| | | | | |
|---|---|---|---|---|
| 6,738,628 B1 * | 5/2004 | McCall et al. | ............ | 455/456.1 |
| 7,904,244 B2 * | 3/2011 | Sugla | ............ | 701/300 |
| 2009/0189810 A1 * | 7/2009 | Murray | ............ | 342/357.14 |

OTHER PUBLICATIONS

Gwon, Y. et al, "Robust Indoor Location Estimation of Stationary and Mobile Users," IEEE Infocom, 2004, pp. 1-11.*
Krishnan, P. et al, "A System for LEASE: Location Estimation Assisted by Stationary Emitters for Indoor RF Wireless Networks," IEEE Infocom 2004, pp. 1-10.*
Niehsen et al, "Information Fusion based on Fast Covariance Intersection Filtering," Proc. of the 5th International Conf. on Information Fusion, Jan. 2002, pp. 901-904.*
King et al, "A Location System Based on Sensor Fusion: Research Areas and Software Architecture," Univeristy of Mannheim, May 2005.*
Lee et al, "A Pyroelectric Infrared Sensor-Based Indoor Location Aware System For the Smart Home," IEEE Trans. on Consumer Electronics, vol. 52, #4, Nov. 2006.*

* cited by examiner

*Primary Examiner* — Gregory C Issing
(74) *Attorney, Agent, or Firm* — Baker & McKenzie LLP

(57) ABSTRACT

A computer-implemented method for locating an indoor object includes: a) receiving an RF coordinate signal and a detecting signal; b) providing information of a located region with reference to the RF coordinate and the detecting signal; c) obtaining a motion sensor coordinate according to the information of the located region; d) providing weights for the RF coordinate and the motion sensor coordinate; e) applying the weights to the RF coordinate and the motion sensor coordinate; and f) combining the weighted RF coordinate and the weighted motion sensor coordinate to generate a fused coordinate corresponding to the position of the indoor object. A system for locating an indoor object is also disclosed.

14 Claims, 8 Drawing Sheets

COMPUTER-IMPLEMENTED METHOD AND SYSTEM FOR LOCATING AN INDOOR OBJECT

CROSS-REFERENCE TO RELATED APPLICATION

This application claims priority of Taiwanese Application No. 098116540, filed on May 19, 2009.

BACKGROUND OF THE INVENTION

1. Field of the Invention

This invention relates to a computer-implemented method and a system for locating an indoor object, more particularly to a computer-implemented method and a system involving fusing radio frequency (RF) coordinate information and motion sensor coordinate information through fusion techniques for locating an indoor object.

2. Description of the Related Art

A conventional system for locating an indoor object, such as that disclosed in "A pyroelectric infrared sensor-based indoor location-aware system (PILAS) for the smart home," Lee et al., IEEE Transactions on Consumer Electronics, Volume 52, Issue 4, November 2006 Page(s): 1311-1317, utilizes a plurality of pyroelectric infrared (PIR) sensors to locate the indoor object. Although the aforesaid conventional PILAS can be used to estimate the position of the indoor object, it has flaws when a plurality of indoor objects are to be located. For example, referring to FIG. 1, when PIR sensors a and b are on and PIR sensor c is off, the PILAS is unable to determine whether there are two indoor objects moving in sensing areas A and B, respectively, or only one indoor object moving in overlapped region AB of sensing areas A and B.

Another conventional system for locating an indoor object involves the use of RF locating techniques, such as the Received Signal Strength (RSS) approach. The RSS approach utilizes at least three reference node RF transceivers, each of which is placed at a pre-determined position, and a blind node RF transceiver carried by the indoor object to locate the indoor object. The RSS approach estimates the position of the indoor object according to at least three RSS signals, each of which is related to a distance between a respective one of the reference node RF transceivers and the blind node RF transceiver. The RSS approach is disadvantageous in that the propagation of radio signals is easily affected by indoor obstacles, such as furniture and people in the indoor area, as well as by other electronic devices, which can result in estimating error and Non-Line-of-Sight (NLOS) error. NLOS error is attributed to signal interference caused by indoor obstacles, and gets worse when the number of indoor obstacles is increased.

SUMMARY OF THE INVENTION

Therefore, the object of the present invention is to provide a computer-implemented method and a system for locating an indoor object.

According to one aspect of the present invention, there is provided a computer-implemented method for locating an indoor object based on an RF coordinate signal from an RF coordinate estimation unit, and at least one detecting signal from a motion sensor array upon detection of movement of the indoor object. The RF coordinate signal carries information of an RF coordinate on a coordinate plane estimating a position of the indoor object. The method comprises: a) receiving the RF coordinate signal and the detecting signal; b) providing information of a located region on the coordinate plane with reference to the RF coordinate and the detecting signal; c) obtaining a motion sensor coordinate on the coordinate plane according to the information of the located region; d) providing weights for the RF coordinate and the motion sensor coordinate; e) applying the weights to the RF coordinate and the sensor coordinate, respectively; and f) combining the weighted RF coordinate and the weighted sensor coordinate to generate a fused coordinate on the coordinate plane corresponding to the position of the indoor object.

According to another aspect of the present invention, there is provided a system for locating an indoor object. The system comprises: an RF coordinate estimation unit configured to output an RF coordinate signal carrying information of an RF coordinate on a coordinate plane estimating a position of the indoor object; a motion sensor coordinate estimation unit including a motion sensor array and a localization module, the motion sensor array including at least one motion sensor configured to output a detecting signal upon detection of movement of the indoor object, the localization module being configured to receive the RF coordinate signal and the detecting signal, to provide information of a located region on the coordinate plane with reference to the RF coordinate and the detecting signal, and to obtain a motion sensor coordinate on the coordinate plane according to the information of the located region; and a fusion unit including a weight generation module and a fused coordinate calculation module. The weight generation module is configured to provide weights for the RF coordinate and the motion sensor coordinate. The fused coordinate calculation module is configured to receive the RF coordinate and the motion sensor coordinate, to apply the weights to the RF coordinate and the motion sensor coordinate, respectively, and to combine the weighted RF coordinate and the weighted motion sensor coordinate to generate a fused coordinate on the coordinate plane corresponding to the position of the indoor object.

BRIEF DESCRIPTION OF THE DRAWINGS

In drawings which illustrate an embodiment of the invention.

DETAILED DESCRIPTION OF THE PREFERRED EMBODIMENT

Figure 1:
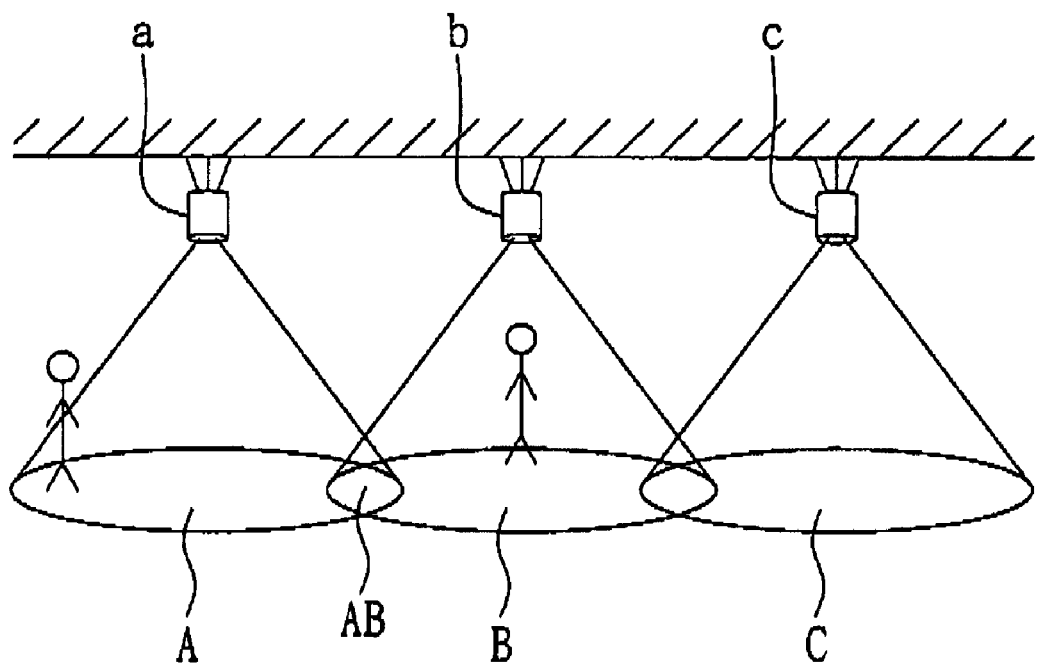
FIG. 1 is a schematic view to illustrate a conventional PILAS used for locating indoor objects.
Figure 2:
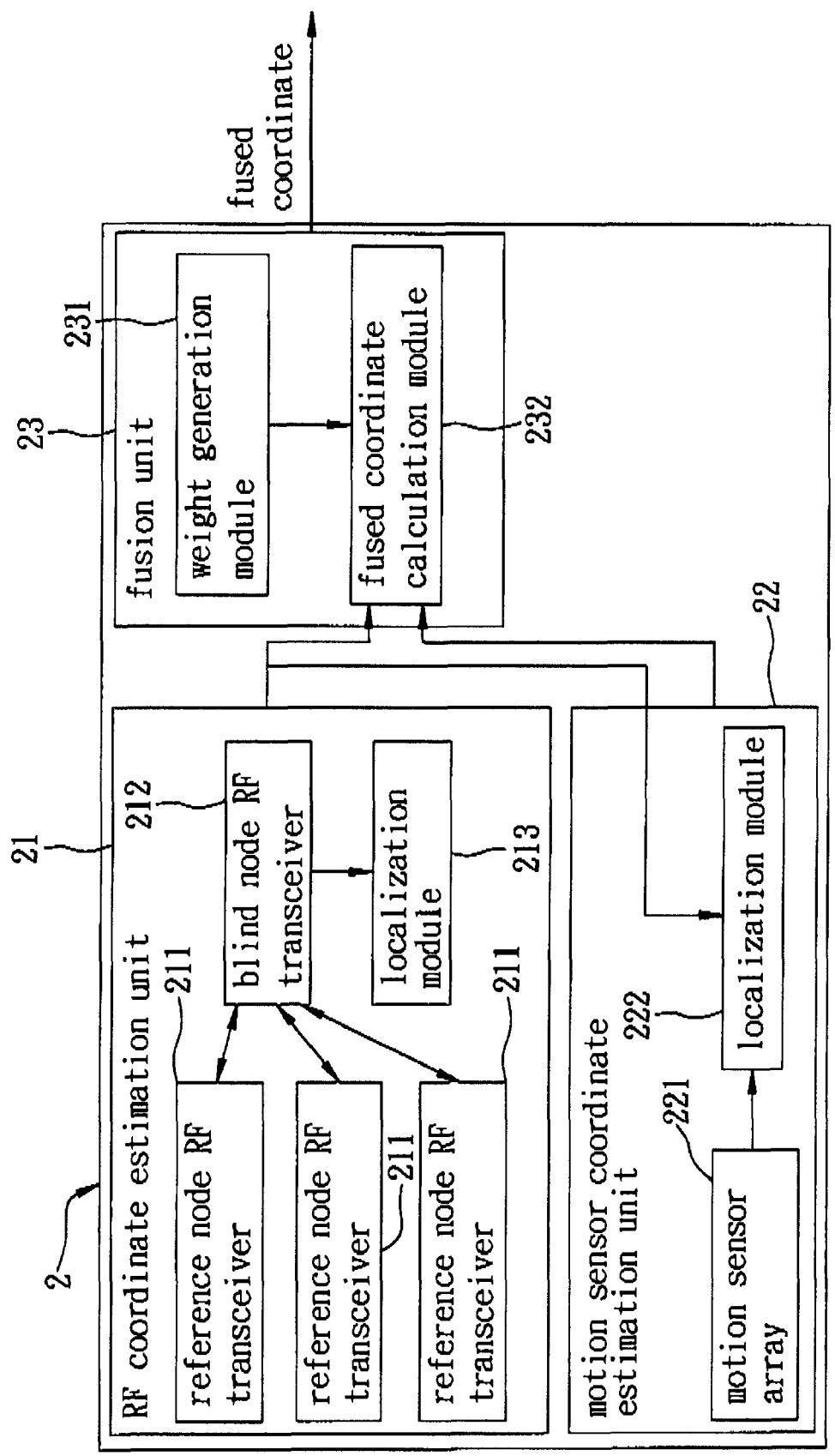
FIG. 2 is a block diagram to illustrate the preferred embodiment of a system for locating an indoor object according to the present invention.
Figure 5A:
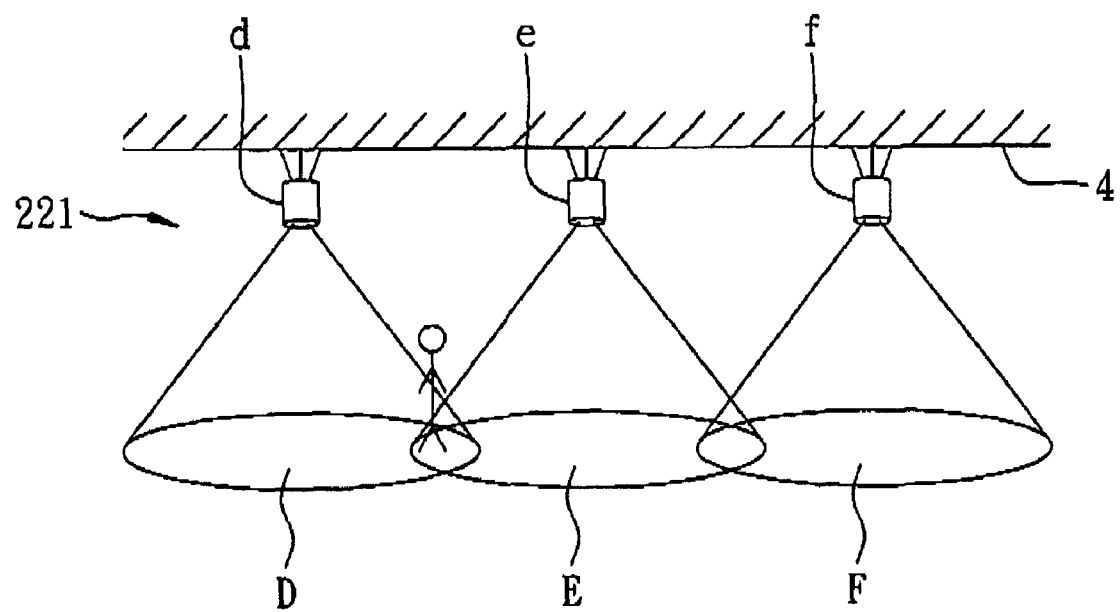
FIG. 5A is a schematic view to illustrate an example of how the indoor object is located by the system of the preferred embodiment when there is only one indoor object in a room.
Figure 5A:
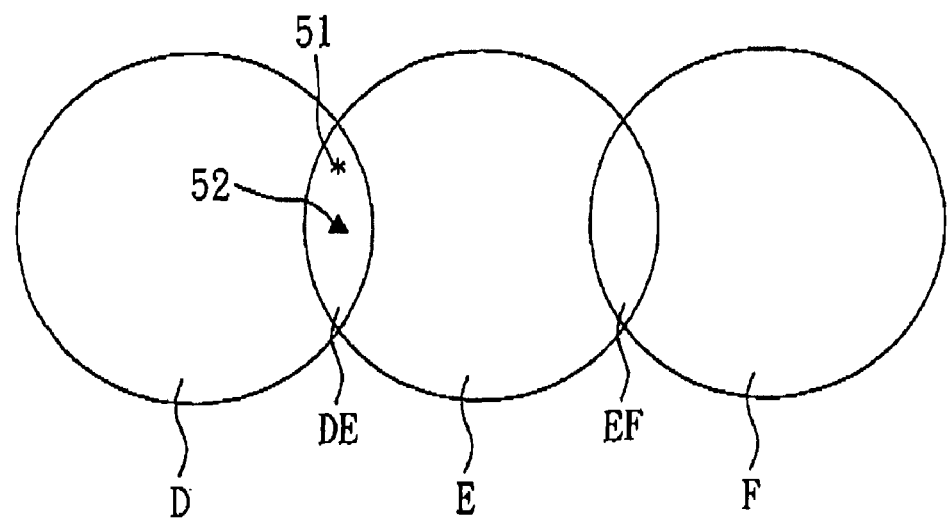

FIG. 2, in combination with FIG. 5A, illustrates the preferred embodiment of a system 2 for locating an indoor object (such as a human) in a room (not shown). The system 2 includes an RF coordinate estimation unit 21 configured to output an RF coordinate signal carrying information of an RF coordinate on a coordinate plane (such as Cartesian plane) estimating a position of the indoor object; a motion sensor coordinate estimation unit 22 configured to output a motion sensor coordinate on the coordinate plane estimating the position of the indoor object; and a fusion unit 23 configured to receive the RF coordinate and the motion sensor coordinate, and to fuse the RF coordinate and the motion sensor coordinate to generate a fused coordinate on the coordinate plane corresponding to the position of the indoor object. In this embodiment, the system 2 is implemented using a wireless network (not shown) for signal transmission and reception.

The RF coordinate estimation unit 21 includes at least three reference node RF transceivers 211, a blind node RF transceiver 212, and a localization module 213. Each of the reference node RF transceivers 211 corresponds to a pre-determined reference node coordinate on the coordinate plane, and is placed at a pre-determined position (not shown) in the room. The blind node RF transceiver 212 is carried by the indoor object. The localization module 213 is configured to receive Received Signal Strength Index (RSSI) values, which are related respectively to the distances between said at least three of the reference node RF transceivers 211 and the blind node RF transceiver 212, from the blind node RF transceiver 212, and to generate the RF coordinate on the coordinate plane according to the pre-determined reference node coordinates on the coordinate plane and the RSSI value. In this embodiment, the reference node RF transceivers 211 are CC2420 chips, and the blind node RF transceiver 212 is a CC2431 chip. The CC2420 chip is a ZigBee™ protocol RF transceiver (compliant with the IEEE 802.15.4 standard) available from Texas Instruments™ (TI) The CC2431 is a System-On-Chip (SOC) that includes a location engine and is based on the ZigBee™ protocol. The functions and operations of the RF coordinate estimation unit 21 are readily appreciated by those skilled in the art. Therefore, further details of the RF coordinate estimation unit 21 are omitted herein for the sake of brevity.

The motion sensor coordinate estimation unit 22 includes a motion sensor array 221 and a localization module 222. The motion sensor array 221 includes at least one motion sensor (there are three motion sensors d, e, f shown in FIG. 5A) configured to output a detecting signal (such as an "ON" signal) upon detection of movement of the indoor object. The localization module 222 is configured to receive the RF coordinate signal and the detecting signal, to provide information of a located region on the coordinate plane with reference to the RF coordinate and the detecting signal, and to obtain the motion sensor coordinate on the coordinate plane according to the information of the located region. In this embodiment, the motion sensor is an AMN34112 chip, which is a passive infrared type motion sensor available from Panasonic™, and is installed on a ceiling 4 (see FIG. 5A) in the room.

The fusion unit 23 includes a weight generation module 231 and a fused coordinate calculation module 232. The weight generation module 231 is configured to provide weights for the RF coordinate and the motion sensor coordinate. The fused coordinate calculation module 232 is configured to receive the RF coordinate and the motion sensor coordinate, to apply the weights to the RF coordinate and the motion sensor coordinate, respectively, and to combine the weighted RF coordinate and the weighted motion sensor coordinate to generate the fused coordinate on the coordinate plane corresponding to the position of the indoor object.

In this embodiment, the functions and operations of the localization module 222 of the motion sensor coordinate estimation unit 22 and the weight generation module 231 and the fused coordinate calculation module 232 of the fusion unit 23 can be performed by a processor of a computer (not shown).

The present invention will be described in more detail with reference to a computer-implemented method for locating the indoor object.

Figure 3:
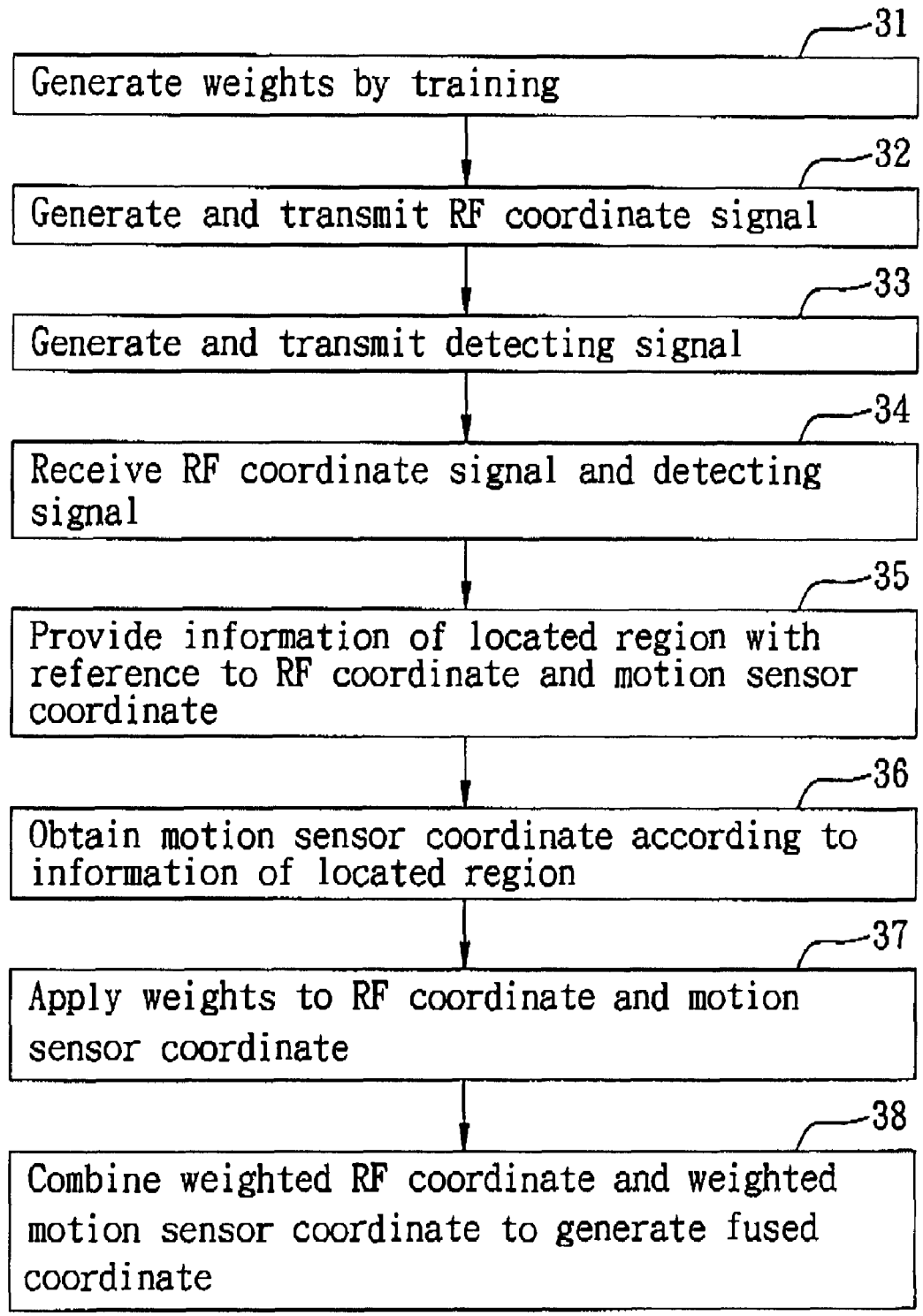
FIG. 3 is a flow chart to illustrate the preferred embodiment of a method for locating an indoor object according to the present invention.
Figure 4:
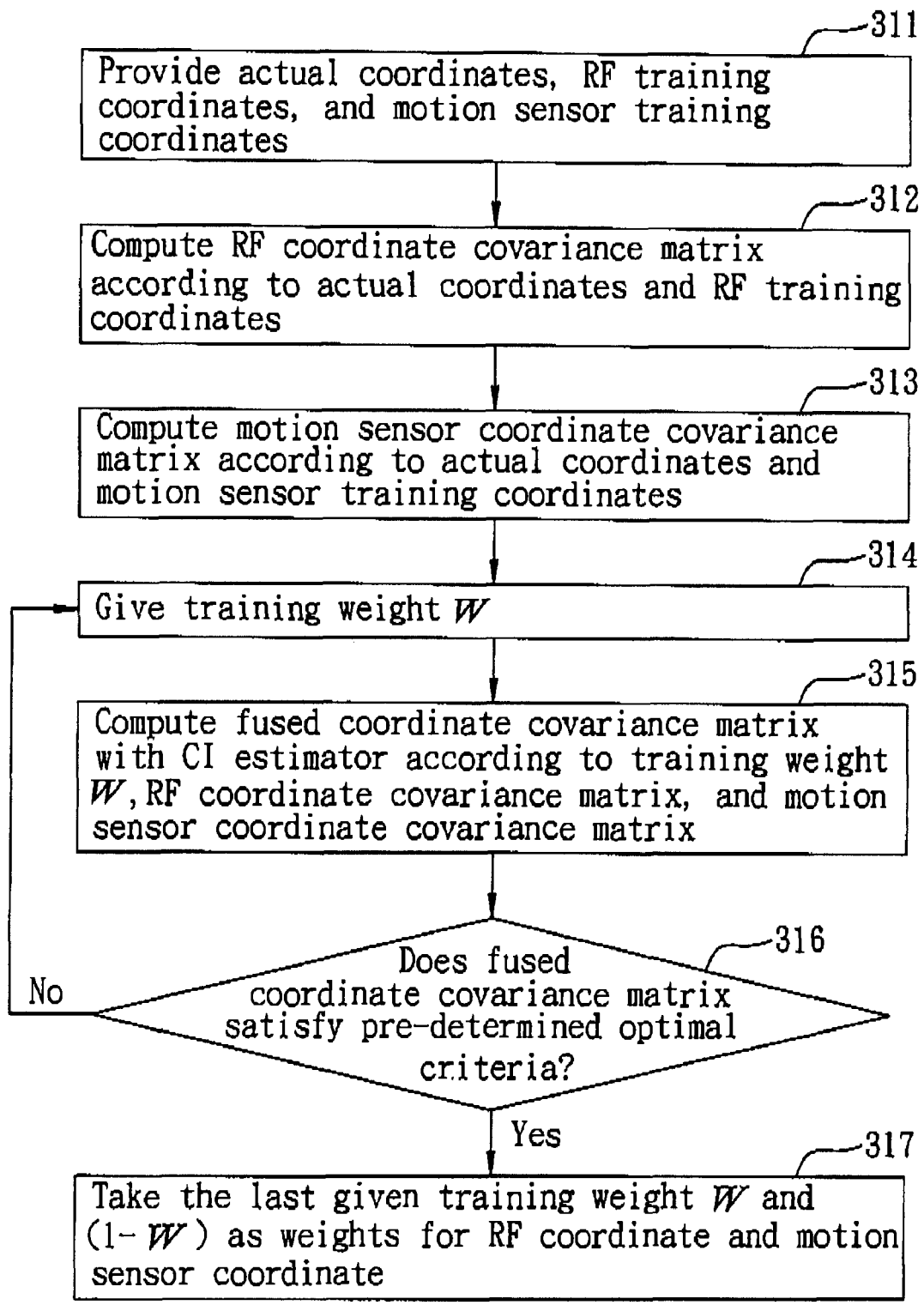
FIG. 4 is a flow chart to illustrate training steps of the method of the preferred embodiment.

Referring to FIGS. 3 and 4, in combination with FIG. 2, the method according to the present invention includes the following steps.

At step 31, the weight generation module 231 of the fusion unit 23 adopts a Covariance Intersection (CI) estimator for offline training and generating the weights for the RF coordinate and the motion sensor coordinate. The CI estimator may be a generalized Kalman filter. The main advantage of using the CI estimator is that it permits data fusion to be performed with probabilistically defined estimates, i.e., a reasonable data fusion result can be achieved without knowing the correlation among those estimates. Hence, no assumptions of dependency between two values are needed by the CI estimator when it fuses the values together.

At sub-step 311 (see FIG. 4), the weight generation module 231 provides a plurality of actual coordinates corresponding to a plurality of training patterns, respectively, a plurality of RF training coordinates corresponding to the training patterns, respectively, and a plurality of motion sensor training coordinates corresponding to the training patterns, respectively. The actual coordinates, the RF training coordinates, and the motion sensor training coordinates can be pre-stored in a computer-readable storage medium (not shown).

At sub-step 312 and sub-step 313, the weight generation module 231 computes an RF coordinate covariance matrix $P_{aa}$ according to the actual coordinates and the RF training coordinates $\bar{a}$, and then computes a motion sensor coordinate covariance matrix $P_{bb}$ according to the actual coordinates and the motion sensor training coordinates $\bar{b}$. The RF coordinate covariance matrix $P_{aa}$ and the motion sensor coordinate covariance matrix $P_{bb}$ are calculated according to the following formulas (1) and (2).

$$\tilde{z} = \hat{z} - \bar{z} \tag{1}$$

$$P_{zz} = E\{\tilde{z}\tilde{z}^T\} \tag{2}$$

where $\hat{z}$ is a vector representing the actual coordinates, and $\bar{z}$ is a vector representing the RF training coordinates $\bar{a}$ when $P_{zz}$ represents the RF coordinate covariance matrix $P_{aa}$ or the motion sensor training coordinates $\bar{b}$ when $P_{zz}$ represents the motion sensor coordinate covariance matrix $P_{bb}$.

At sub-step 314, the weight generation module 231 gives a training weight W.

At sub-step 315, the weight generation module 231 computes a fused coordinate covariance matrix $P_{cc}$ with the CI estimator according to the training weight W, the RF coordinate covariance matrix $P_{aa}$, and the motion sensor coordinate covariance matrix $P_{bb}$. The CI estimator uses the following formulas (3) and (4).

$$P_{cc}^{-1} = WP_{aa}^{-1}\bar{a} + (1-W)P_{bb}^{-1}\bar{b} \quad (3)$$

$$\bar{c} = P_{cc}\{WP_{aa}^{-1}\bar{a} + (1-W)P_{bb}^{-1}\bar{b}\} \quad (4)$$

where, $0 \leq W \leq 1$.

At sub-step 316, the weight generation module 231 determines whether the fused coordinate covariance matrix $P_{cc}$ satisfies a pre-determined optimal criterion (such as whether a minimum trace value of the fused coordinate covariance matrix $P_{cc}$ is found, or whether a minimum determinant value of the fused coordinate covariance matrix $P_{cc}$ is found). If the fused coordinate covariance matrix $P_{cc}$ satisfies the pre-determined optimal criteria, then the flow continues to sub-step 317, otherwise, the flow returns to sub-step 314.

In this embodiment, sub-steps 314~316 can be conducted using functions of mathematic tools, such as the MATLAB™ fminbnd function.

At sub-step 317, the weight generation module 231 takes the last given training weight W and (1−W) as the weights for the RF coordinate and the motion sensor coordinate when the fused coordinate covariance matrix $P_{cc}$ satisfies the pre-determined optimal criterion.

It should be noted herein that step 31 is performed only one time, and is required to be performed again when any of the motion sensors of the motion sensor array 221 is reinstalled at a different position, or any of the reference node RF transceivers 211 is replaced.

At step 32, the RF coordinate estimation unit 21 generates and transmits the RF coordinate signal carrying information of the RF coordinate on the coordinate plane. If there are more than one indoor objects in the room, the RF coordinate estimation unit 21 generates an RF coordinate signal for each of the indoor objects.

At step 33, the motion sensor array 221 of the motion sensor coordinate estimation unit 22 generates the detecting signal upon detection of movement of the indoor object, and transmits the detecting signal via the wireless network to the localization module 222 of the motion sensor coordinate estimation unit 22.

At step 34, the localization module 222 of the motion sensor coordinate estimation unit 22 receives the RF coordinate signal and the detecting signal.

At step 35 and step 36, the localization module 222 of the motion sensor coordinate estimation unit 22 provides information of the located region on the coordinate plane with reference to the RF coordinate and the detecting signal, and obtains the motion sensor coordinate on the coordinate plane according to the information of the located region.

When only one detecting signal is received, the localization module 222 provides information of a predetermined sensing area of the motion sensor array 221 on the coordinate plane in which the RF coordinate falls, defines the predetermined sensing area as the located region, and takes a geometric center of the predetermined sensing area as the motion sensor coordinate.

When more than one detecting signals are received, the localization module 222 provides information of a plurality of pre-determined sensing areas of the motion sensor array 221 on the coordinate plane, such that at least two of the pre-determined sensing areas overlap each other so as to divide the pre-determined sensing areas into an overlapped region and non-overlapped regions, determines one of the non-overlapped regions and the overlapped region, in which the RF coordinate falls, as the located region, and takes a geometric center of one of the predetermined sensing areas corresponding to one of the non-overlapped regions when the RF coordinate falls in said one of the non-overlapped regions as the motion sensor coordinate, and takes a geometric center of the overlapped region when the RF coordinate falls in the overlapped region as the motion sensor coordinate.

Figure 5B:
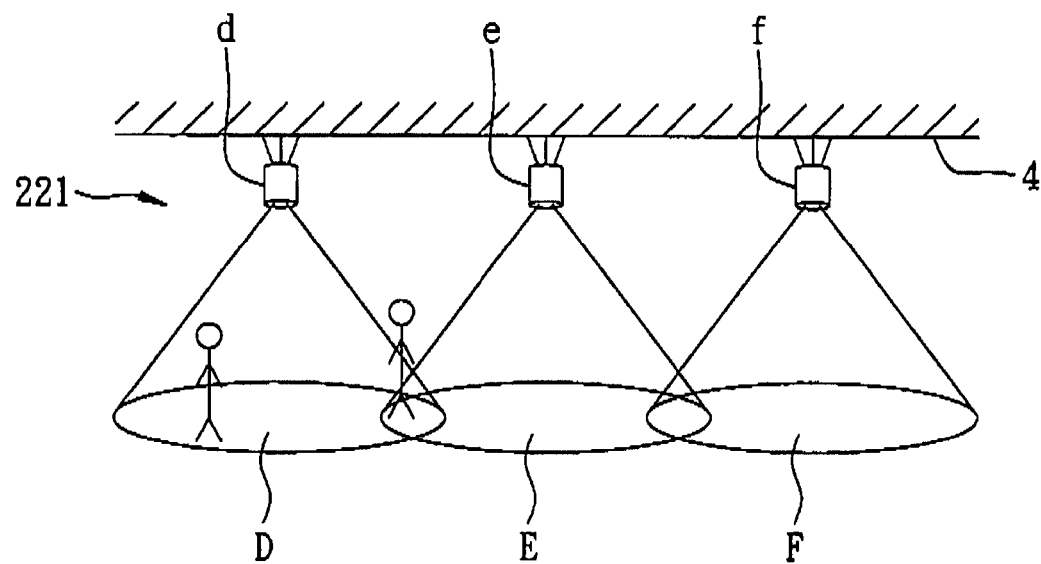
FIG. 5B is a schematic view to illustrate an example of how the indoor object is located by the system of the preferred embodiment when there are two indoor objects in the room.
Figure 5B:
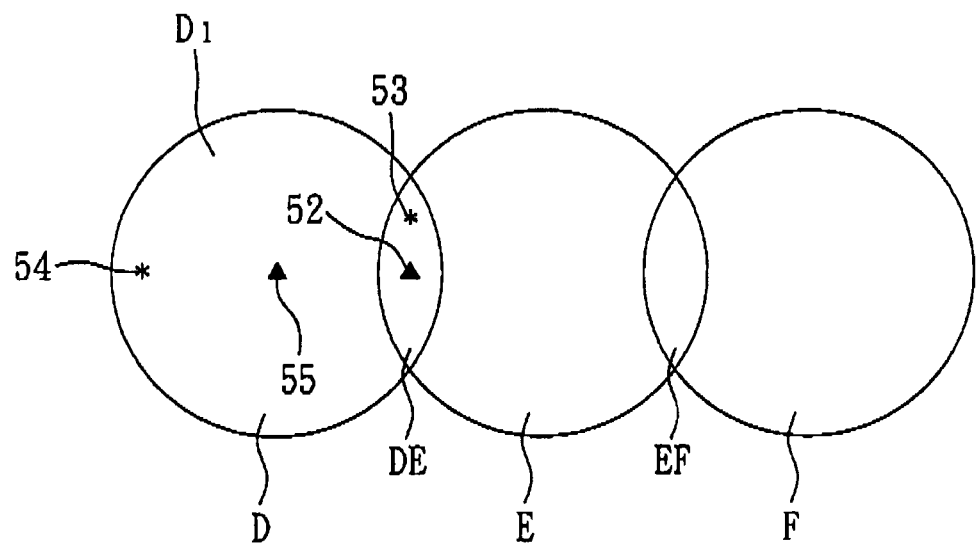
Figure 5C:
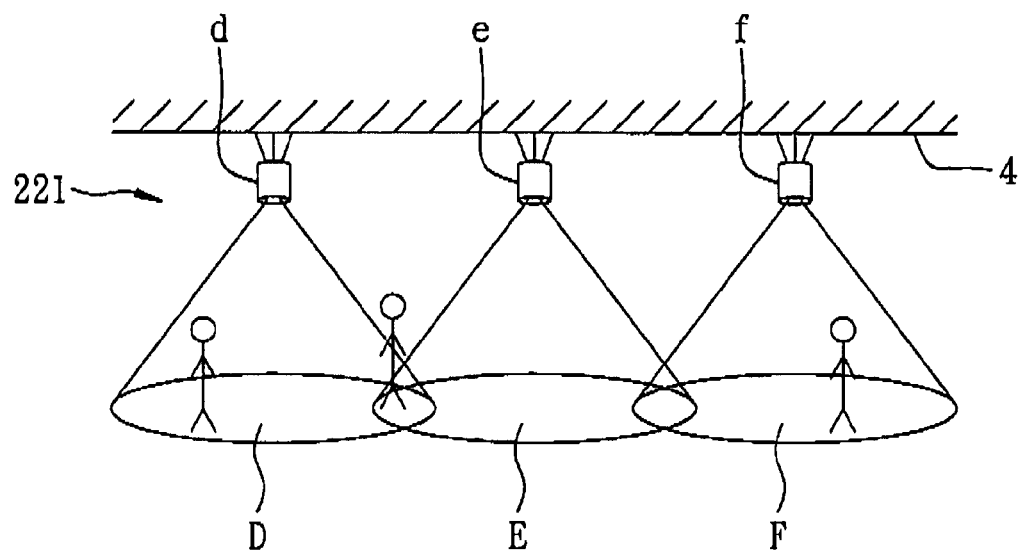
FIG. 5C is a schematic view to illustrate an example of how the indoor object is located by the system of the preferred embodiment when there are three indoor objects in the room.
Figure 5C:
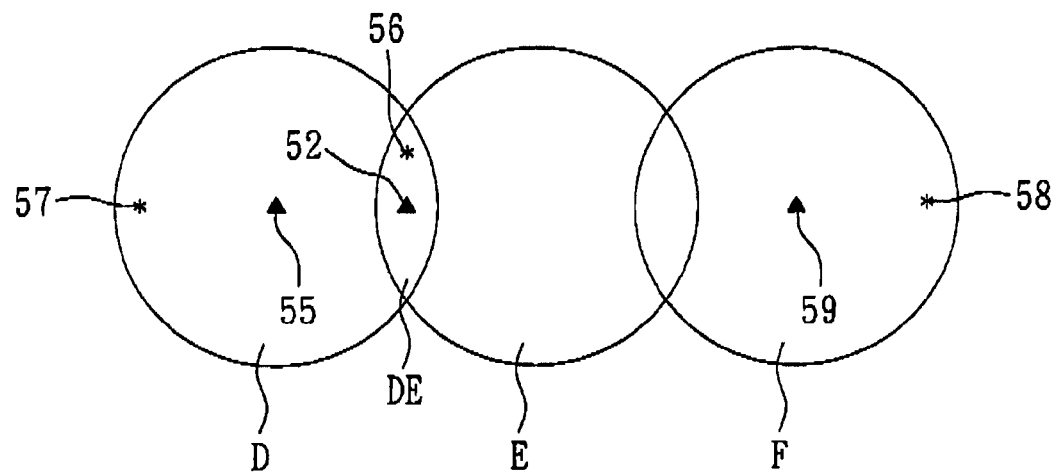

With reference to FIGS. 5A-5C, the above steps 34-36 will be described in more detail using the following examples of locating the indoor object by the system under different situations. In these examples, the motion sensor array 221 of the motion sensor coordinate estimation unit 22 includes three motion sensors d, e, and f installed on the ceiling 4 in the room and operable to detect an indoor object(s) within the predetermined sensing areas D, E, and F, respectively. The information of the predetermined sensing areas D, E, and F (such as the geometric centers of the predetermined sensing areas D, E, and F) and the overlapped regions DE and EF can be pre-stored in the computer readable storage medium (not shown).

FIG. 5A illustrates the example for the situation when there is only one indoor object in the room. The localization module 222 of the motion sensor coordinate estimation unit 22 receives one RF coordinate signal carrying information of a RF coordinate 51, and two detecting signals of motion sensors d and e upon detection of movement of the indoor S object (step 34), then provides information of the predetermined sensing areas D, E and the overlapped region DE, and determines the overlapped region DE in which the RF coordinate 51 falls (in this situation, the RF coordinate 51 is nearest to a geometric center 52 of the overlapped region DE) as the located region (step 35). The localization module 222 of the motion sensor coordinate estimation unit 22 then takes the geometric center 52 of the overlapped region DE as the motion sensor coordinate for estimating the position of the indoor object (step 36) and outputs the motion sensor coordinate to the fused coordinate calculation module 232.

FIG. 5B illustrates the example for the situation when there are two indoor objects in the room. The localization module 222 of the motion sensor coordinate estimation unit 22 receives two RF coordinate signals carrying information of two RF coordinates 53 and 54, respectively, and two detecting signals of motion sensors d and e upon detection of the indoor objects (step 34), and then provides information of the predetermined sensing areas D, E, and the overlapped region DE and determines the overlapped region DE in which the RF coordinate 53 falls and a non-overlapped region $D_1$ in which the RF coordinate 54 falls as the located regions (step 35). The localization module 222 of the motion sensor coordinate estimation unit 22 then takes the geometric center 52 of the overlapped region DE, and a geometric center 55 of the predetermined sensing area D corresponding to the non-overlapped region $D_1$, as the motion sensor coordinates for estimating the positions of the indoor objects, respectively, (step 36) and outputs the motion sensor coordinates to the fused coordinate calculation module 232.

FIG. 5C illustrates the example for the situation when there are three indoor objects in the room. Similar to the previous examples, the localization module 222 of the motion sensor coordinate estimation unit 22 takes the geometric center 52 of the overlapped region DE in which the RF coordinate 56 falls, the geometric center 55 of the predetermined sensing area D in which the RF coordinate 57 falls, and a geometric center 59 of the predetermined sensing area F in which the RF coordinate 58 falls, as the motion sensor coordinates for estimating the positions of the indoor objects, respectively, and outputs the motion sensor coordinates to the fused coordinate calculation module 232.

Figure 5D:
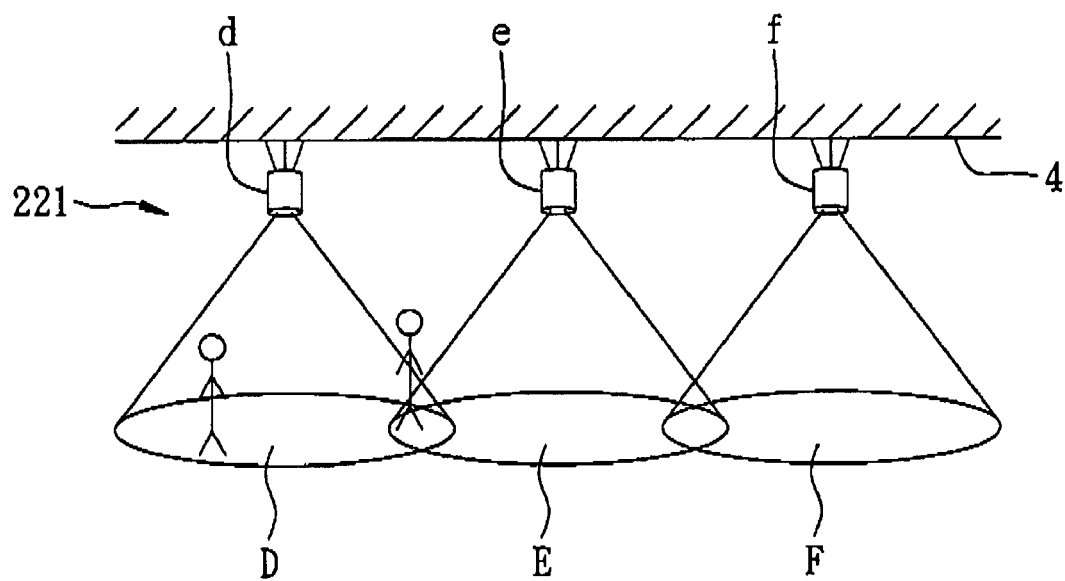
FIG. 5D is a schematic view to illustrate an example of how the indoor object is located by the system of the preferred embodiment when there are two indoor objects in the room and an RF coordinate is contaminated by environmental factors, such as indoor objects.
Figure 5D:
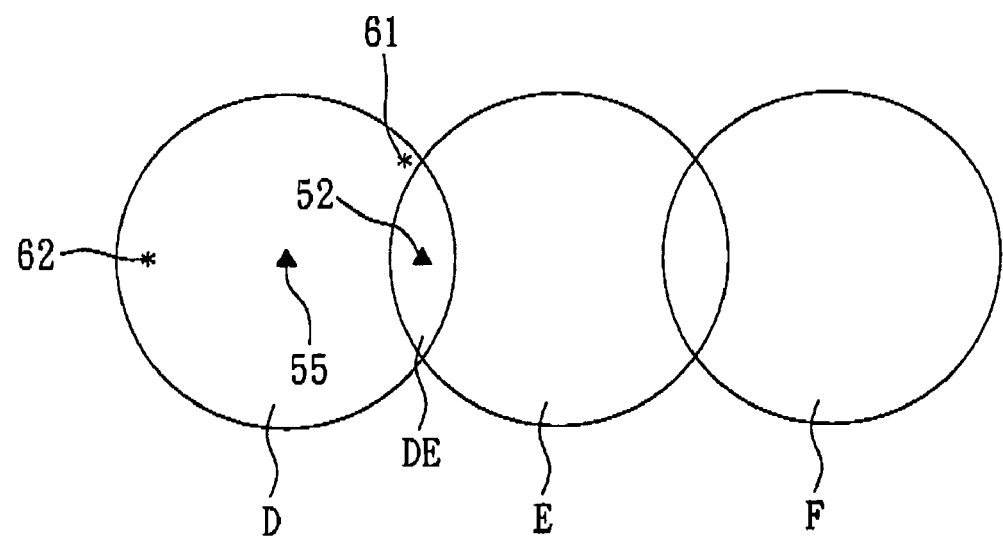

It should be noted herein that the estimating result (the RF coordinate) of the RF coordinate estimation unit 21 (FIG. 2) is prone to error, i.e., deviates from the actual coordinate of the indoor object, as a result of the influence of indoor obstacles. For example, with reference to FIG. 5D, the localization module 222 of the motion sensor coordinate estimation unit 22 receives two RF coordinate signals carrying information of two RF coordinates 61 and 62, and two detecting signals of motion sensors d and e upon detection of movement of the indoor objects. In this example, both the RF coordinates 61 and 62 fall in the predetermined sensing area D, with the RF coordinate 61 close to the overlapped region DE. Hence, in this example, the RF coordinate 61 deviates from the actual coordinate as a result of environmental factors, such as indoor obstacles, and the actual coordinate should be in the overlapped region DE. When a case like this occurs, i.e., an inconsistency between the RF coordinate signals and the detection signals, the localization module 222 performs additional computations. In this case, the localization module 222 first determines whether the RF coordinate 61 is close to the overlapped region DE and is nearer to the geometric center 52 of the overlapped region DE as compared to the geometric center 55 of the predetermined sensing area D. If the above condition is satisfied, the localization module 222 then takes the geometric center 52 of the overlapped region DE and the geometric center 55 of the predetermined sensing area D, in which the RF coordinate 62 falls, as the motion sensor coordinates, respectively.

At step 37, the fused coordinate calculation module 232 of the fusion unit 23 receives the RF coordinate $[x_{RF\_i}\ y_{RF\_i}]^T$ and the motion sensor coordinate $[x_{Motion\_i}\ y_{Motion\_i}]^T$, and applies the weights to the RF coordinate $[x_{RF\_i}\ y_{RF\_i}]^T$ and the motion sensor coordinate $[x_{Motion\_i}\ y_{Motion\_i}]^T$.

At step 38, the fused coordinate calculation module 232 of the fusion unit 23 sums the weighted RF coordinate and the weighted the motion sensor coordinate to generate the fused coordinate $[x_{Fused\_i}\ y_{Fused\_i}]^T$ on the coordinate plane corresponding to the position of the indoor object. The fused coordinate $[x_{Fused\_i}\ y_{Fused\_i}]^T$ is calculated according to the following formula (5).

$$\begin{bmatrix} x_{Fused\_i} \\ y_{Fused\_i} \end{bmatrix} = W \begin{bmatrix} x_{RF\_i} \\ y_{RF\_i} \end{bmatrix} + (1-W) \begin{bmatrix} x_{Motion\_i} \\ y_{Motion\_i} \end{bmatrix} \quad (5)$$

In sum, the method as well as the system of the preferred embodiment provides a more reliable and accurate result for locating the indoor object by fusing the RF coordinate and the motion sensor coordinate. When there is more than one indoor object in the room, the method as well as the system of the preferred embodiment can locate each of the indoor objects more accurately as compared to the aforesaid conventional systems.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A computer-implemented method for locating an indoor object based on a radio frequency (RF) position signal from an RF position estimation system, and at least one detecting signal from a motion sensor array upon detection of movement of the indoor object, the RF position signal carrying information of an RF position on a position plane estimating a position of the indoor object, said method comprising:
   a) receiving the RF position signal and the detecting signal;
   b) providing information of a located region on the position plane with reference to the RF position and the detecting signal;
   c) obtaining a motion sensor position on the position plane according to the information of the located region;
   d) adopting a covariance intersection (CI) estimator for offline training and generating weights for the RF position and the motion sensor position;
   e) applying the weights to the RF position and the motion sensor position, respectively; and
   f) combining the weighted RF position and the weighted motion sensor position to generate a fused position on the position plane corresponding to the position of the indoor object;
   wherein when only one detecting signal is received in step a), step b) is performed by providing information of a predetermined sensing area of the motion sensor array on the position plane in which the RF position falls, followed by defining the predetermined sensing area as the located region; and
   wherein when more than one detecting signals are received in step a), step b) includes the sub-steps of:
      b-1) providing information of a plurality of pre-determined sensing areas of the motion sensor array on the position plane, such that at least two of the pre-determined sensing areas overlap each other so as to divide the pre-determined sensing areas into an overlapped region and non-overlapped regions; and
      b-2) determining one of the non-overlapped regions and the overlapped region, in which the RF position falls, as the located region.

2. The method of claim 1, wherein the motion sensor position is a geometric center of the predetermined sensing area.

3. The method of claim 1, wherein the motion sensor position is a geometric center of one of the predetermined sensing areas corresponding to one of the non-overlapped regions when the RF position falls in said one of the non-overlapped regions, and is a geometric center of the overlapped region when the RF position falls in the overlapped region.

4. The method of claim 1, wherein, in step d), a sum of the weights is equal to 1, and in step f), the weighted RF position and the weighted sensor position are summed to generate the fused position.

5. The method of claim 1, wherein step d) includes the sub-steps of:
   d-1) providing a plurality of actual positions corresponding to a plurality of training patterns, respectively;
   d-2) providing a plurality of RF training positions corresponding to the training patterns, respectively;
   d-3) computing an RF position covariance matrix according to the actual positions and the RF training positions corresponding to the training patterns;
   d-4) providing a plurality of motion sensor training positions corresponding to the training patterns, respectively;
   d-5) computing a motion sensor position covariance matrix according to the actual positions and the motion sensor training positions corresponding to the training patterns; and
   d-6) generating the weights with the CI estimator according to the RF position covariance matrix and the motion sensor position covariance matrix.

6. The method of claim 5, wherein sub-step d-6) includes the sub-steps of:
   d-6-1) giving a training weight W;
   d-6-2) computing a fused position covariance matrix with the CI estimator according to the training weight W, the RF position covariance matrix, and the motion sensor position covariance matrix;
   d-6-3) performing d-6-1) and d-6-2) iteratively until a minimum trace value for the fused position covariance matrix is found; and
   d-6-4) taking the last given training weight W and (1-W) as the weights when the minimum trace value of the fused position covariance matrix is found.

7. The method of claim 5, wherein sub-step d-6) includes the sub-steps of:
   d-6-1) giving a training weight W;
   d-6-2) computing a fused position covariance matrix with the CI estimator according to the training weight W, the RF position covariance matrix, and the motion sensor position covariance matrix;
   d-6-3) performing d-6-1) and d-6-2) iteratively until a minimum determinant value for the fused coordinate covariance matrix is found; and
   d-6-4) taking the last given training weight W and (1-W) as the weights when the minimum determinant value of the fused position covariance matrix is found.

8. A system for locating an indoor object, comprising:
   a radio frequency (RF) position estimation system including at least three reference node RF transceivers, a blind node RF transceiver, and a localization module, wherein each of said reference node RF transceivers correspond to a pre-determined reference node coordinate on a position plane and are placed at a pre-determined position, said blind node RF transceiver being carried by an indoor object, said localization module being configured to receive Received Signal Strength Index (RSSI) values related to distances between said at least three reference node RF transceivers and said blind node RF transceiver, and to generate a RF position on the position plane according to the pre-determined reference node positions on the position plane and the RSSI values;
   a motion sensor position estimation system including a motion sensor array and a localization module, said motion sensor array including at least one motion sensor configured to output a detecting signal upon detection of movement of the indoor object, said localization module of the motion sensor position estimation system being configured to receive the RF position signal and the detecting signal, to provide information of a located region on the position plane with reference to the RF position and the detecting signal, and to obtain a motion sensor position on the position plane according to the information of the located region; and
   a fusion system including a weight generation module and a fused position calculation module, said weight generation module of said fusion system adopting a covariance intersection (CI) estimator for offline training and generating the weights for the RF position and the motion sensor position, said fused position calculation module being configured to receive the RF position and the motion sensor position, to apply the weights to the RF position and the motion sensor position, respectively, and to combine the weighted RF position and the weighted motion sensor position to generate a fused position on the position plane corresponding to the position of the indoor object.

9. The system of claim 8, wherein said motion sensor array of said motion sensor position estimation system includes a motion sensor, said localization module being configured to provide information of a pre-determined sensing area of the motion sensor array on the position plane in which the RF position falls, and to define the pre-determined sensing area.

10. The system of claim 9, wherein the motion sensor position obtained from said localization module according to the information of the predetermined sensing area of the motion sensor array on the position plane in which the RF position falls is a geometric center of the pre-determined sensing area.

11. The system of claim 8, wherein said motion sensor array of said motion sensor position estimation system includes a plurality of motion sensors, said localization module of said motion sensor position estimation system being configured to provide information of a plurality of pre-determined sensing areas of the motion sensor array on the position plane in response to the detecting signals generated from said motion sensors, such that at least two of the pre-determined sensing areas overlap each other so as to divide the pre-determined sensing areas into an overlapped region and non-overlapped regions, said localization module being further configured to determine one of the non-overlapped regions and the overlapped region, in which the RF position falls.

12. The system of claim 11, wherein said localization module of said motion sensor position estimation system is further configured in such a manner that when the RF position falls in one of the non-overlapped regions, the motion sensor position obtained from said localization module according to the information of the located region is a geometric center of one of the predetermined sensing areas corresponding to said one of the non-overlapped regions, and is a geometric center of the overlapped region when the RF position falls in the overlapped region.

13. The system of claim 8, wherein a sum of the weights provided by said weight generation module of said fusion system is equal to 1, and said fused position calculation module is configured to sum the weighted RF position and the weighted motion sensor position to generate the fused position.

14. The system of claim 8, wherein said weight generation module of said fusion system is configured to compute an RF position covariance matrix according to a plurality of actual positions corresponding to a plurality of training patterns, respectively, and a plurality of RF training positions corresponding to the training patterns, respectively, further to compute a motion sensor position covariance matrix according to the actual positions and a plurality of motion sensor training positions corresponding to the training patterns, respectively, and to generate the weights with the CI estimator according to the RF position covariance matrix and the motion sensor position covariance matrix.

* * * * *